April 12, 1932.  G. O. DEGENER  1,853,762
MANIFOLDING DEVICE
Filed Nov. 7, 1930    11 Sheets-Sheet 1

INVENTOR
Gustave O. Degener.
BY Baldwin Wight ATTORNEYS

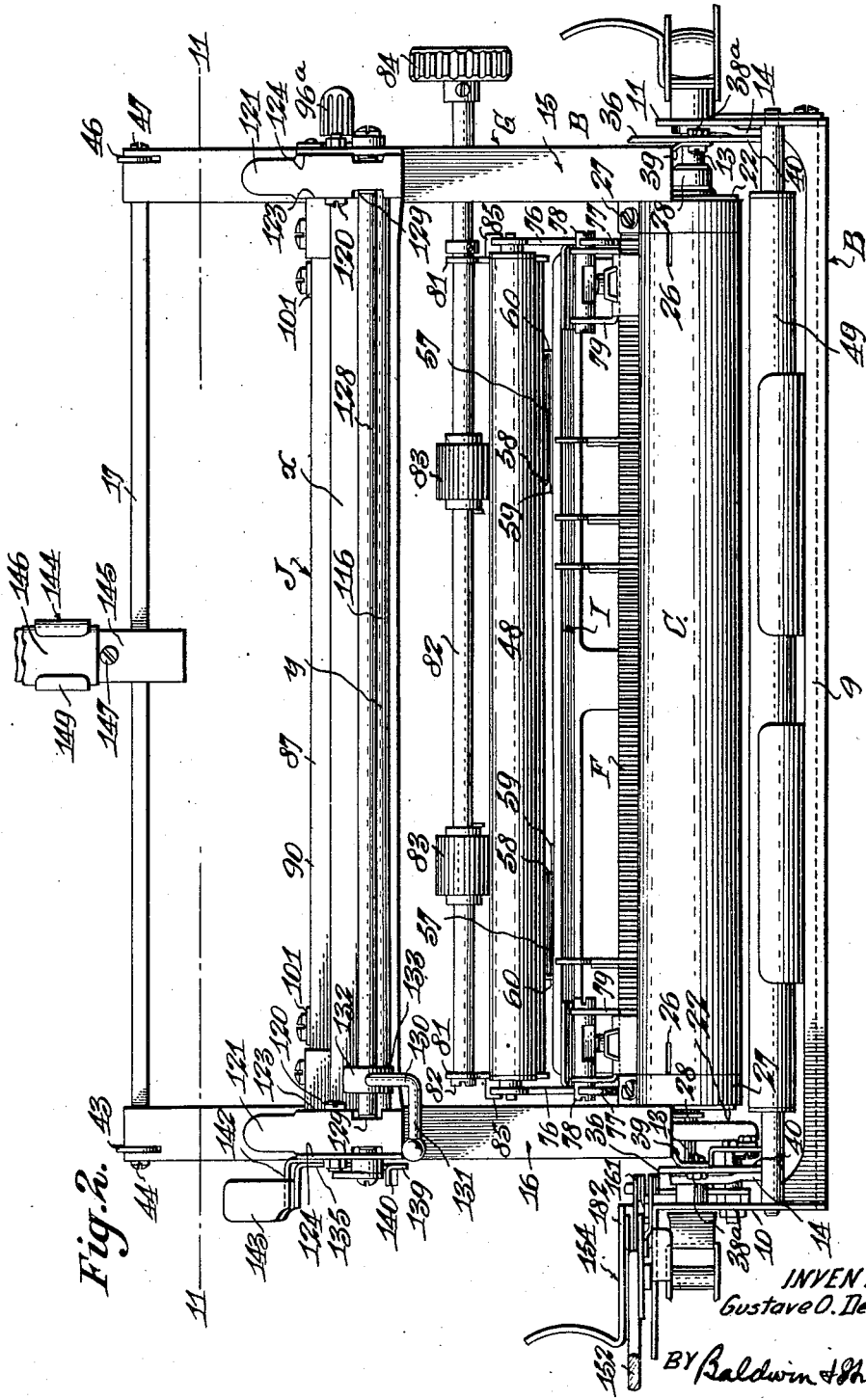

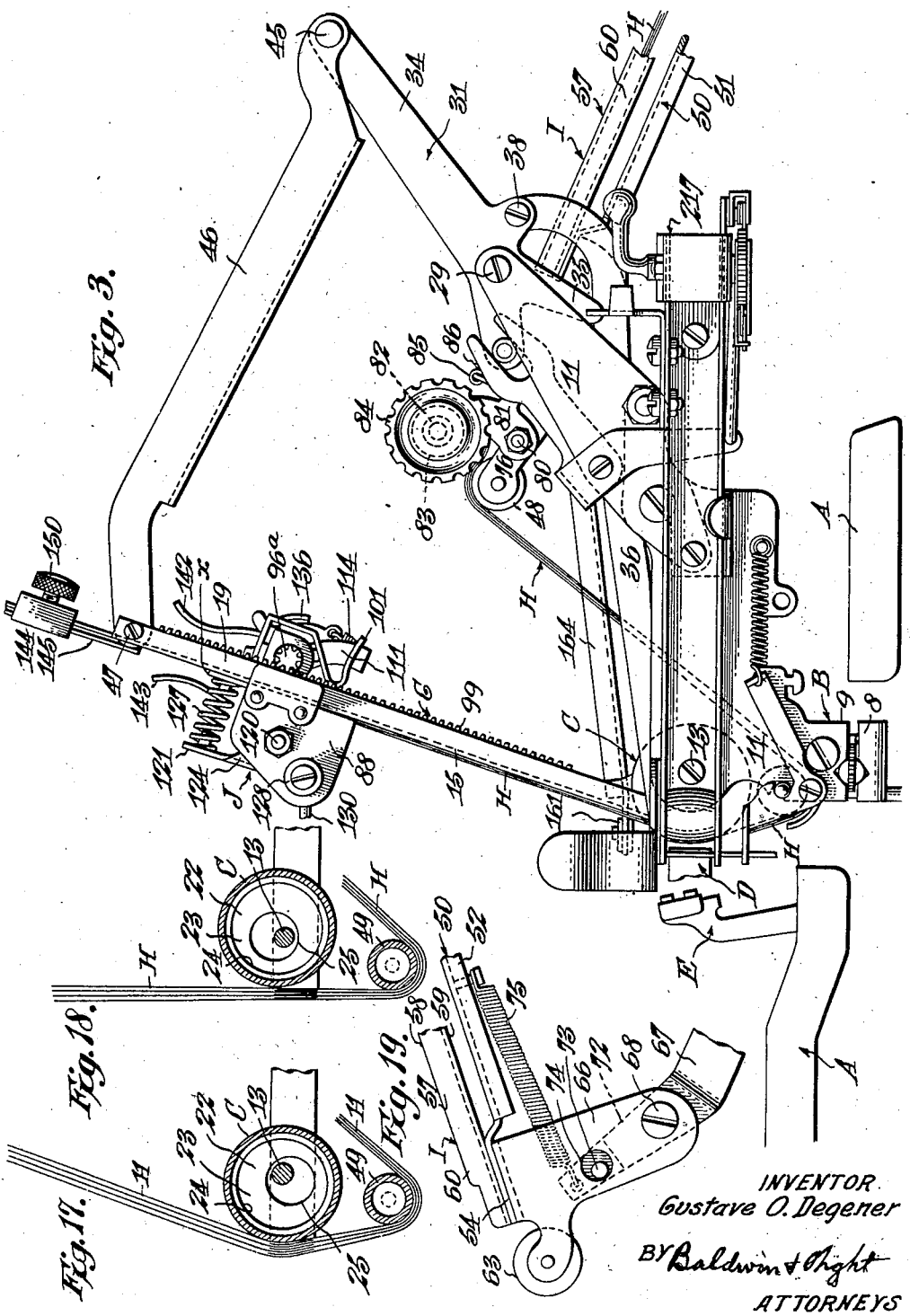

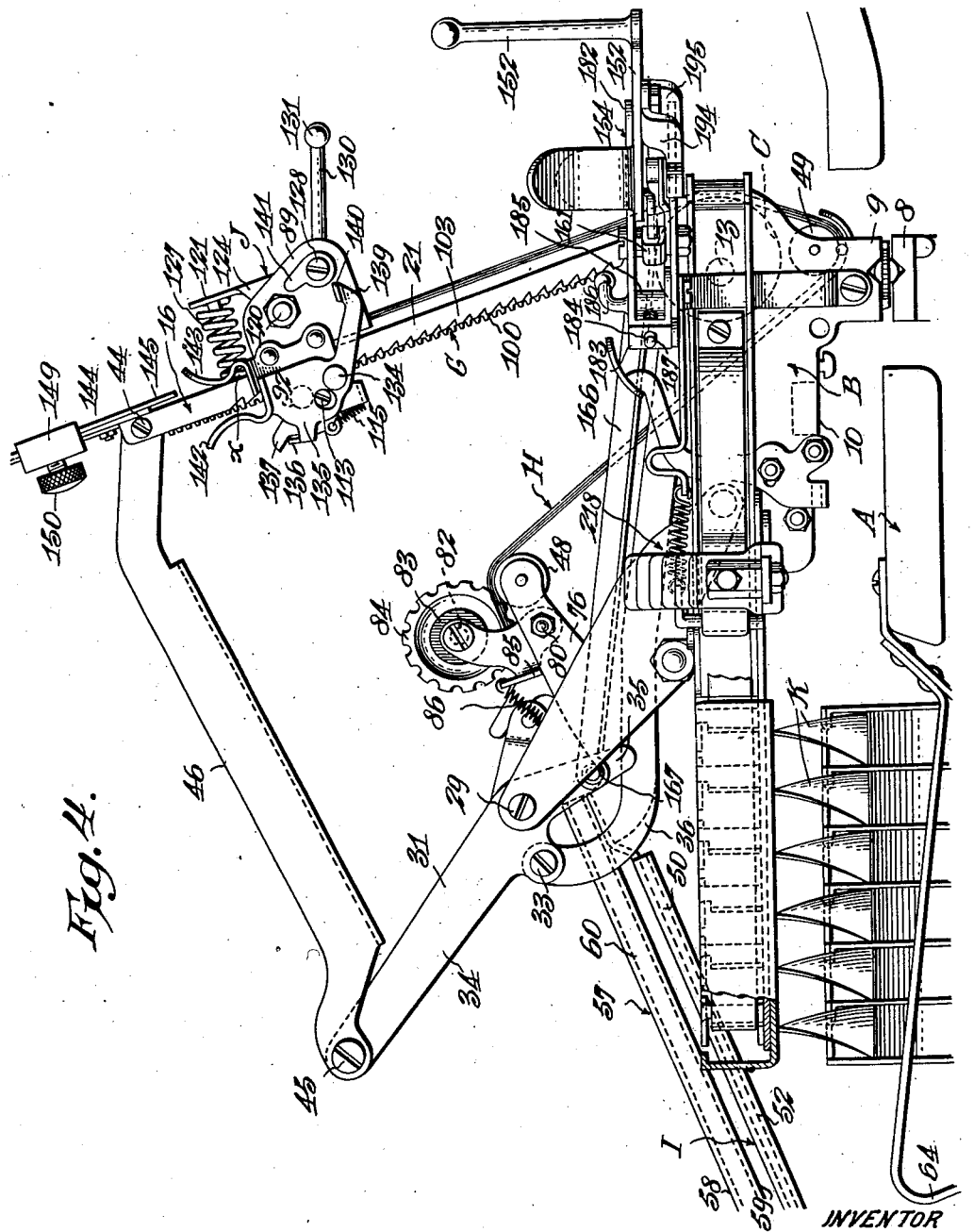

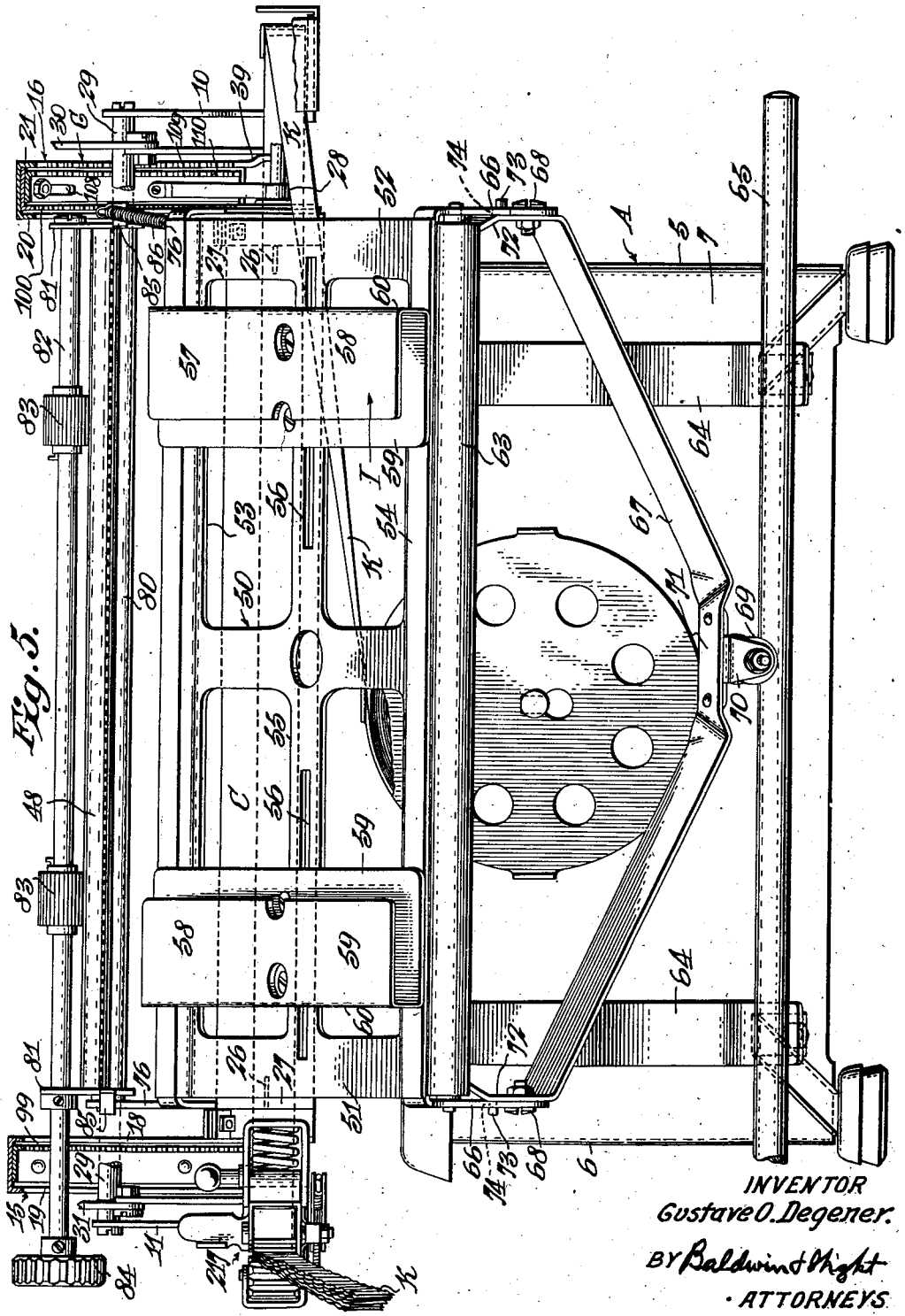

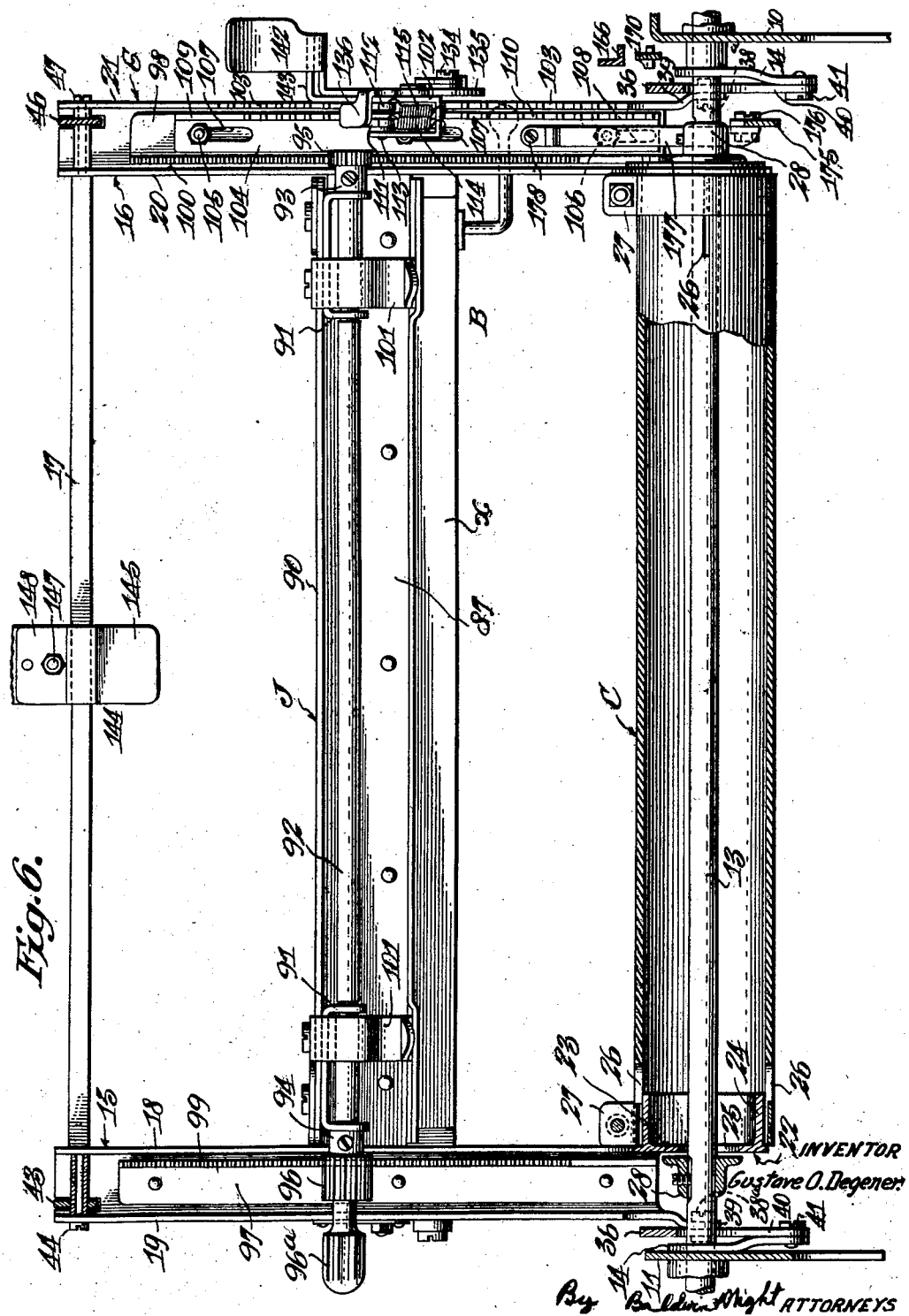

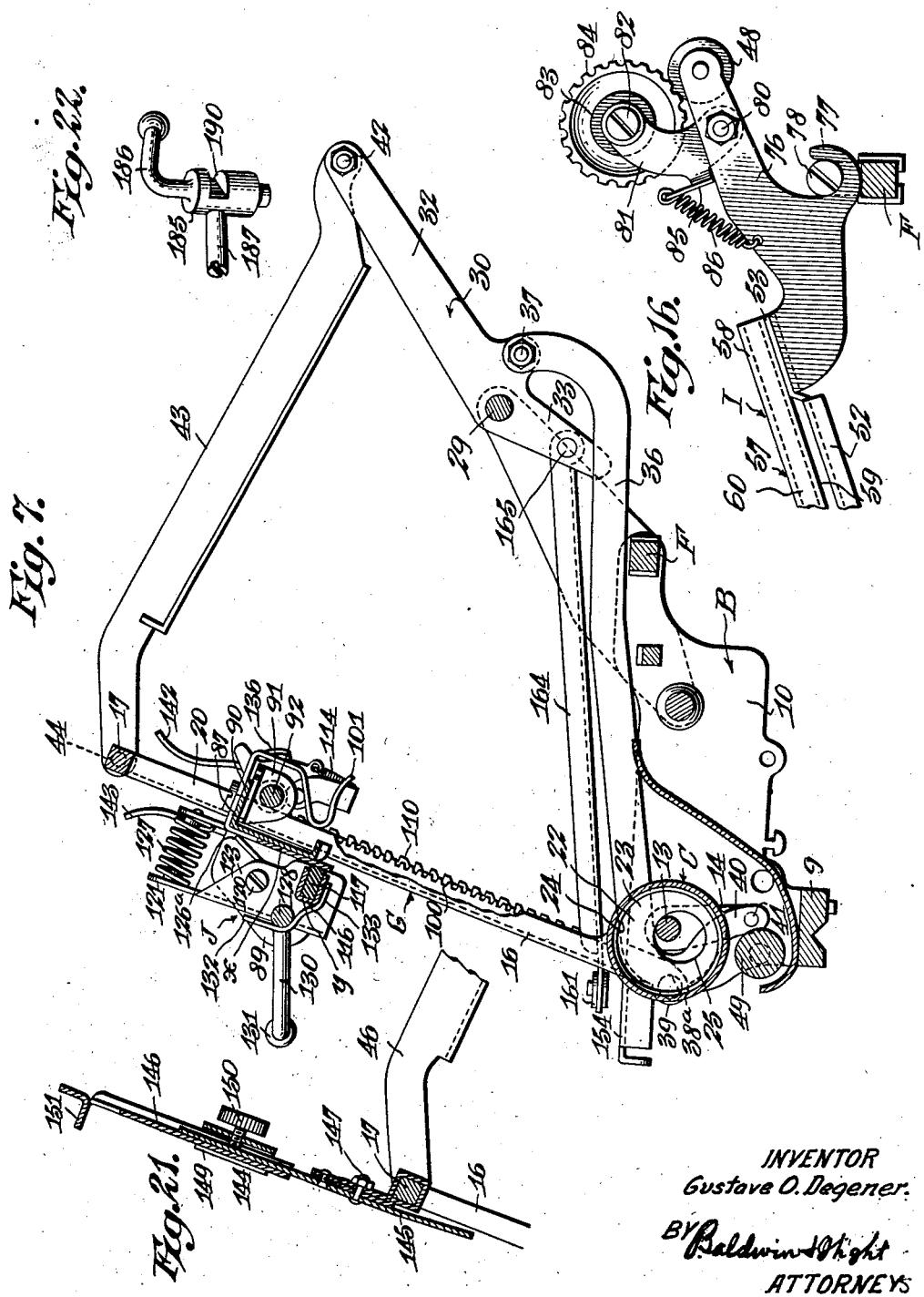

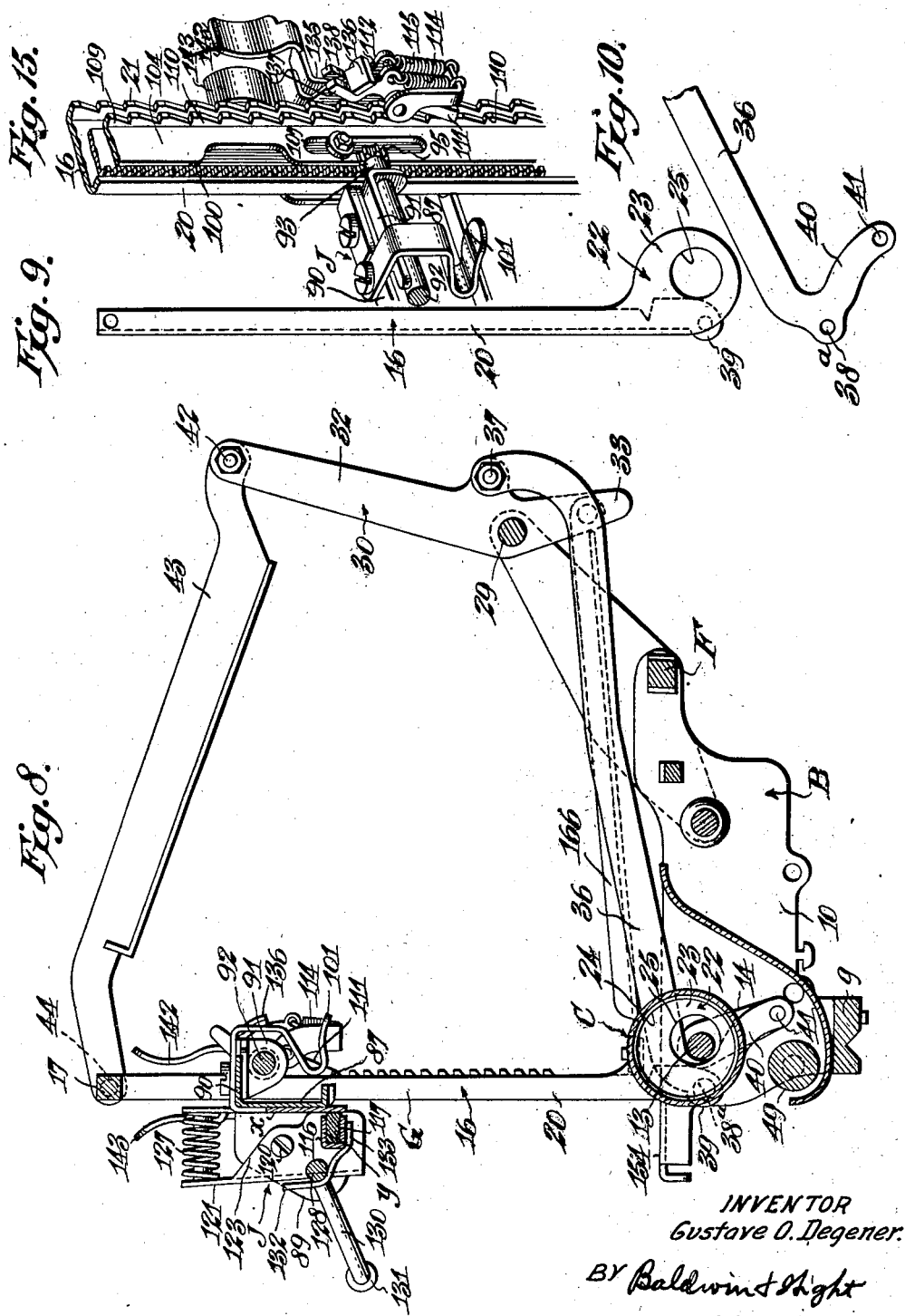

April 12, 1932.  G. O. DEGENER  1,853,762
MANIFOLDING DEVICE
Filed Nov. 7, 1930  11 Sheets-Sheet 9
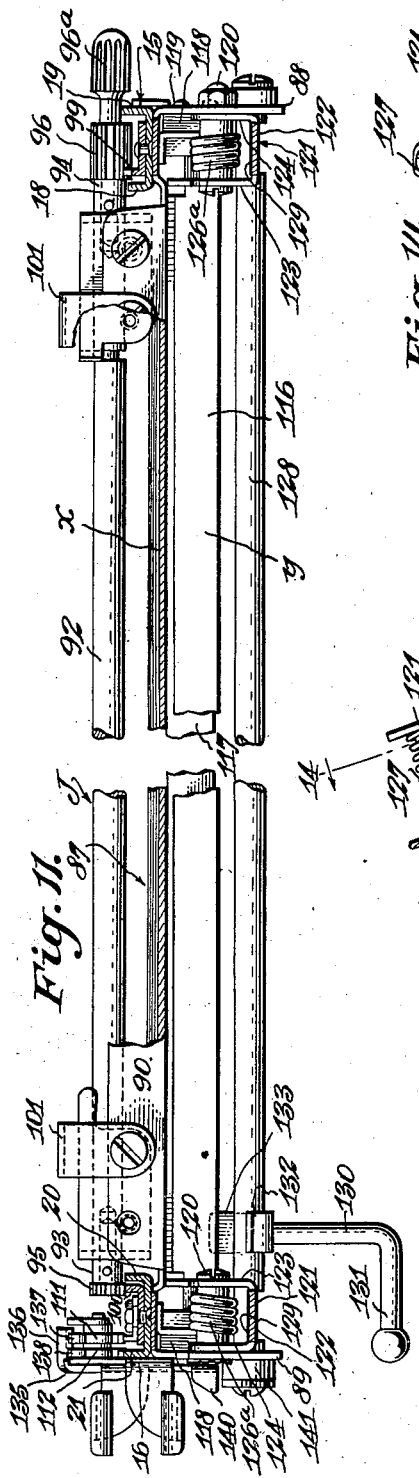
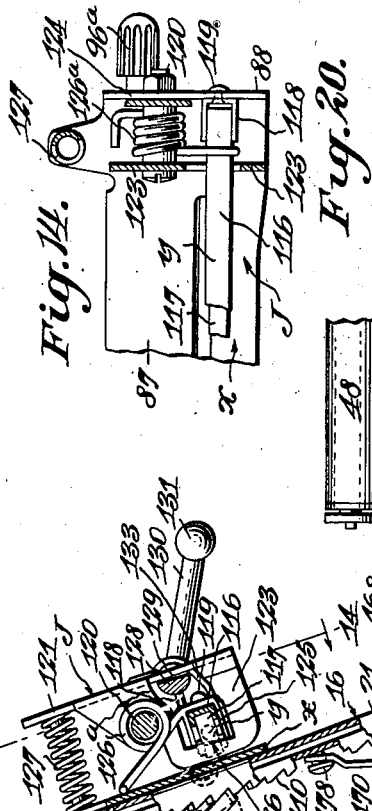
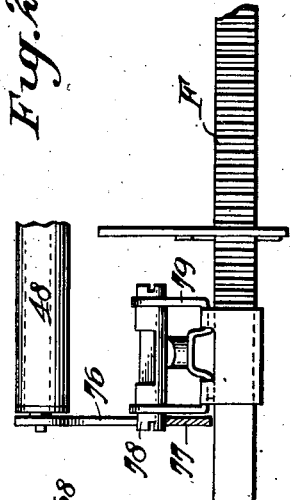
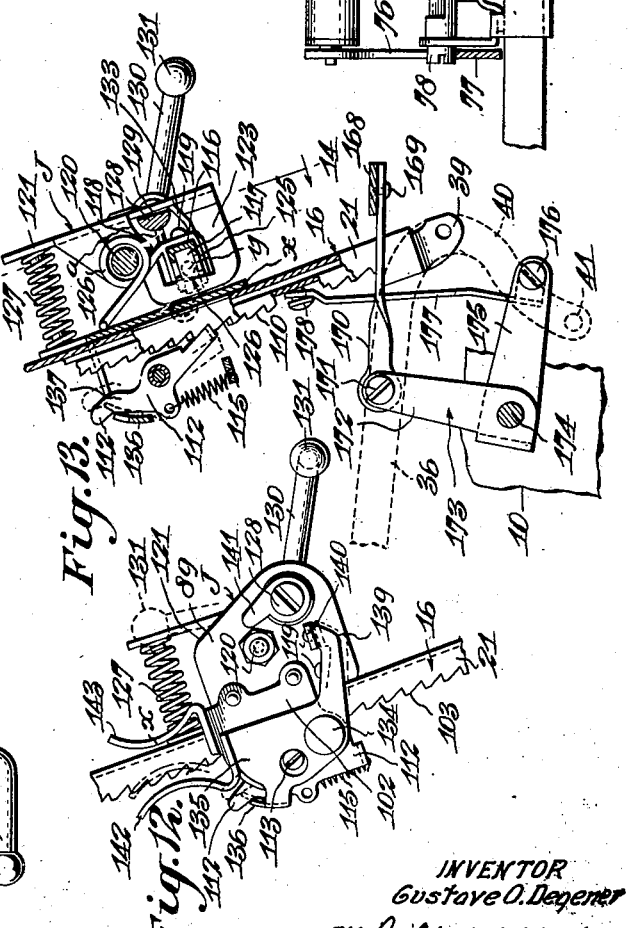
INVENTOR
Gustave O. Degener
BY Baldwin Wight
ATTORNEYS

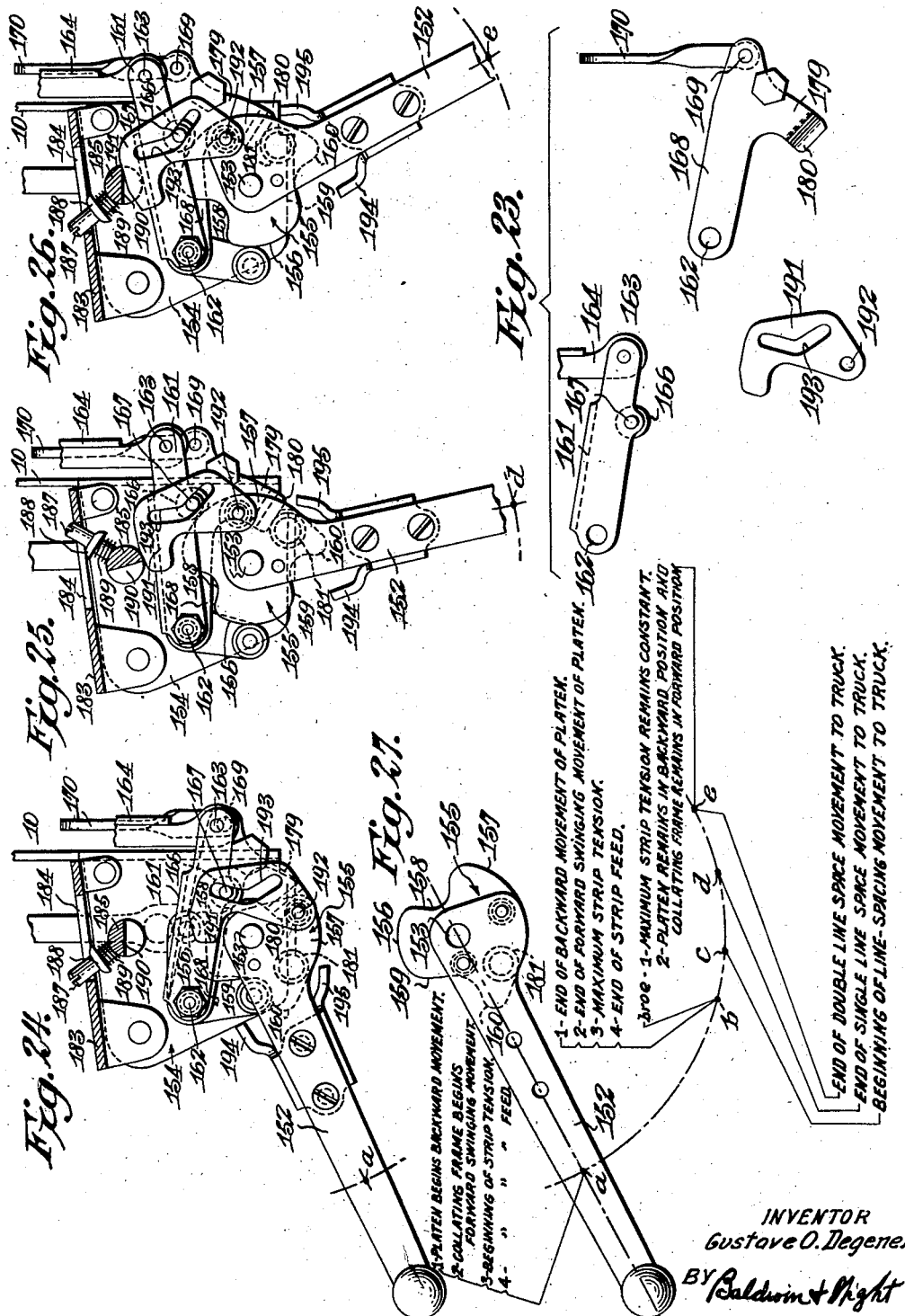

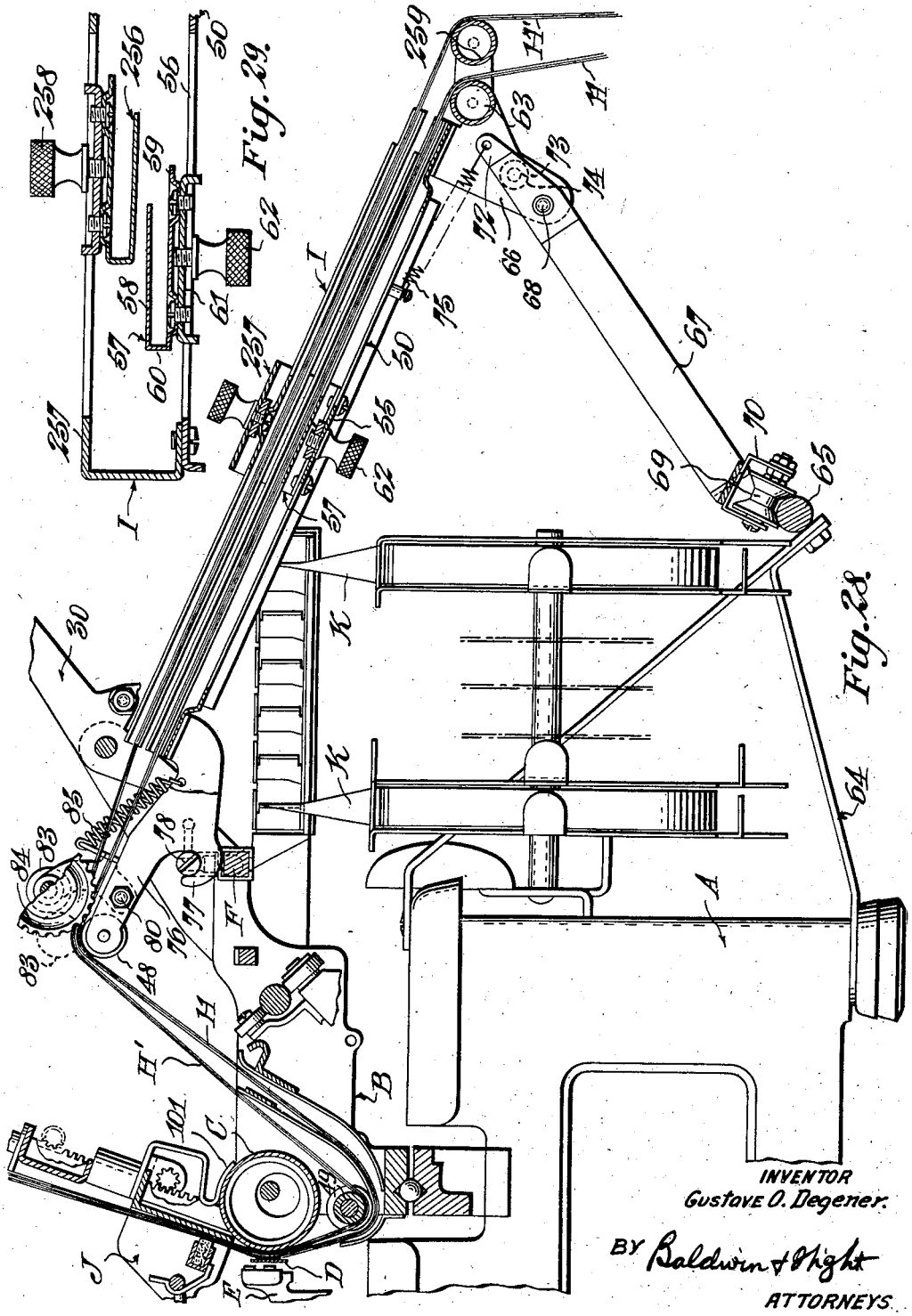

Patented Apr. 12, 1932

1,853,762

UNITED STATES PATENT OFFICE

GUSTAVE O. DEGENER, OF SAN FRANCISCO, CALIFORNIA, ASSIGNOR TO ROYAL TYPE-WRITER COMPANY, INC., OF NEW YORK, N. Y., A CORPORATION OF NEW YORK

MANIFOLDING DEVICE

Application filed November 7, 1930. Serial No. 494,094.

This invention relates to new and useful improvements in manifolding devices which may be readily attached to any standard typewriting machine without changing such machine in any material respect, and embodies certain improvements over the inventions disclosed in my co-pending application Serial No. 133,437, filed Sept. 3, 1926, and in the divisional application thereof Serial No. 194,-135, filed May 25, 1927, and in application Serial No. 359,934 filed May 2, 1929. The present invention, and likewise the inventions of the co-pending applications above noted, is designed for the purpose of writing on continuous forms of work sheets which are frequently in lengths of several hundred feet.

Among the several objects of this invention are to provide a single operating lever, such as the carriage return lever, for first bodily moving the platen rearwardly and thereby relieve the normal tight contact relation between the platen and the work sheets, and to effect a line spacing movement to the paper clamp while the platen is in its relieved position; to provide a collating frame for the work sheets and to mount a truck on the frame for step-by-step movements therealong for line spacing the work sheets by a swinging movement of the manually operable carriage return lever; to provide manually operable means for disengaging the truck from the line spacing mechanism so as to permit the truck to gravitate along the collating frame to its initial position; to provide said truck with a manually operable means for first releasing the clamp of the truck from the work sheets and for subsequently releasing the truck from the line spacing mechanism; to provide a novel means for mounting the non-rotatable platen on the collating frame and for mounting the entirety on the carriage whereby upon operation of the carriage return lever the collating frame will be swung forwardly and the platen will be bodily moved rearwardly; to provide a table in rear of the platen and movable with the carriage for supporting the work sheets as they are fed forwardly past the platen and to provide said table with laterally adjustable guides for the work sheets whereby the guides may be adjusted for accommodating work sheets of different widths; to provide such a table with superposed paper guides which are laterally adjustable independently of one another whereby two sets of work sheets of different widths, one under the other, may be led to the platen, and to provide the table with one or more freely rotatable rolls at the receiving end of the table for guiding the work sheets upwardly and thence forwardly onto the table.

In the drawings:—

Figure 2 is a front elevation thereof,

Figure 3 is a right hand elevation of the carriage,

Figure 4 is a left hand elevation of the carriage,

Figure 1:
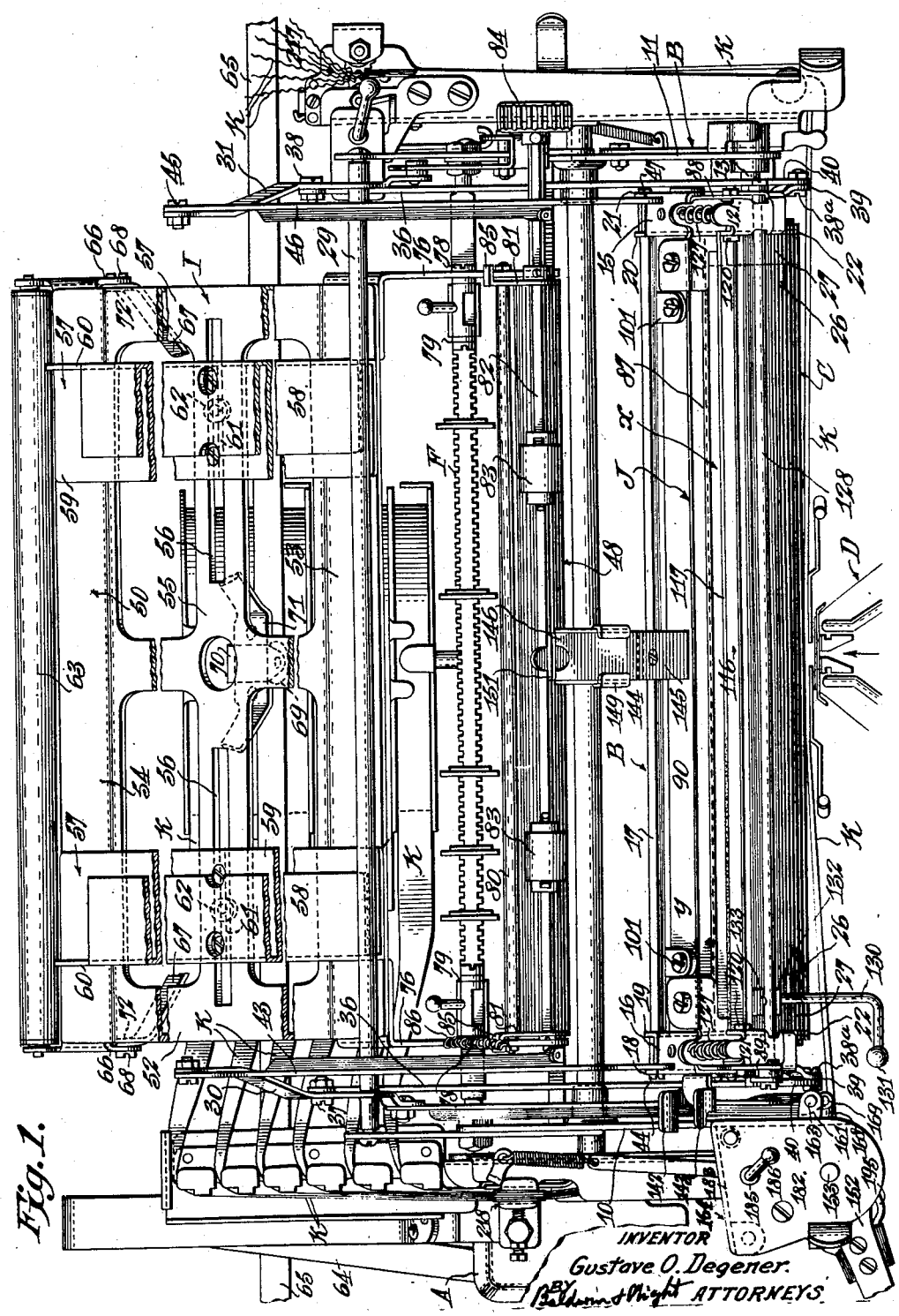
Figure 1 is a top plan view of a typewriter carriage embodying my invention.

Figure 5 is a rear elevation of the machine showing the application of my invention, the collating frame being broken away, Figure 6 is a rear elevation of the collating frame, showing the paper truck thereon, the mechanism for raising the truck, and the means for supporting the frame and platen, Figure 7 is a vertical sectional view showing the collating frame in its normal or rearwardly inclined position, and the platen in its normal or forward printing position, Figure 8 is a similar view but showing the collating frame in its forward position and the platen in its rearward position, Figure 9 is a view in elevation of one of the side bars forming the collating frame, Figure 10 is a fragmentary view in elevation of one end of a link which supports the collating frame and the platen, Figure 11 is a horizontal sectional view taken on the line 11—11 of Figure 2, Figure 12 is an enlarged detailed elevation showing the means for releasing the movable clamping bar of the truck and for simultaneously releasing the holding pawls of the truck from the collating frame, Figure 13 is a vertical sectional view showing a modified form of truck wherein the clamping bar is slidably mounted, the view also showing separate connections for raising the truck, Figure 14 is a sectional view taken on the line 14—14 of Figure 13, Figure 15 is an enlarged perspective view showing particularly the means for holding the paper truck in different positions on the collating frame and the hand operated means for releasing the truck from the frame, Figure 16 is an enlarged detailed side elevation showing the manually operable paper feed roll in its normal or non-feeding position, Figure 17 is a vertical sectional view showing more or less diagrammatically a modified form in which the lower guide roll is disposed farther to the right of the machine, Figure 18 is a similar view but showing the work sheets in a vertical plane and separated from the platen, Figure 19 is an enlarged detail side elevation showing the spring connection between the table and the support therefor, Figure 20 is an enlarged elevation showing the connection between the front of the table and the carriage, Figure 21 is an enlarged vertical sectional view through the end gage for the work sheets, Figure 22 is a perspective view of the adjustable post with which the carriage return lever cooperates for limiting the line spacing movement of the work sheets to either a single or a double movement, Figure 23 is a view showing the separated parts with which the carriage return lever cooperates for effecting certain movements to the work sheets and carbon strips, Figure 24 is a horizontal section showing the carriage return lever in its normal position and with the various cooperating elements in their normal positions, Figure 25 is a similar view but showing the carriage return lever moved to a position for effecting a single line spacing movement to the work sheets, Figure 26 is a view similar to Figure 25 but showing the carriage return lever moved to a position for effecting a double line spacing movement to the work sheets, Figure 27 is a view of a timing diagram showing the extent of movement of the collating frame and the platen, the time of feeding the carbon strips, and the time of applying the tension to said strips, Figure 28 is a vertical sectional view through the carriage and paper guide, illustrating a modification wherein work sheets of different widths are employed, and Figure 29 is an enlarged detail vertical sectional showing of the adjustable upper and lower guides for the work sheets.

The invention as illustrated in the accompanying drawings is shown as being applied to the well known standard Royal typewriting machine, but it is to be understood that my invention is adapted to be applied to other types of typewriting machines, or to calculating machines and the like.

The typewriting machine includes a main frame A, a carriage B, a platen C, a main ribbon D, type bars E which are operated in the usual manner, and the usual tabular stop rod F.

The main frame A includes side walls 5 and 6 and a rear wall 7. Fixed to the main frame A is a bottom rail 8 for supporting the carriage B through the medium of a top rail 9 fixed to the carriage.

The carriage includes end plates 10 and 11 respectively, and rigidly connected to the front portions of the end plates is a rod 13. Journaled on this rod adjacent the inner faces of the end plates are hanger arms 14, 14 which form a pivotal support for a collating frame G and the platen C, the latter being rigidly connected to the former. The collating frame G includes spaced channel shaped side bars 15 and 16 which are rigidly connected at their upper ends by a cross rod 17 which is angular in cross section, and at their lower ends by the platen C. The side bars 15 and 16 are arranged so that the channels open rearwardly. The side bar 15 is thus provided with inner and outer longitudinal flanges 18 and 19 respectively and the side bar 16 is provided with inner and outer longitudinal flanges 20 and 21 respectively. Integral with the lower ends of the flanges 18 and 20 of the side bars 15 and 16 respectively are inwardly extending cupshaped heads 22, each head including a circular wall 23 arranged in the plane of the flange 18 or 20 to which it is attached and a circular flange 24, the wall 23 being provided with a circular opening 25 for receiving the rod 13, the openings 25 being of larger diameters than the rod 13 so as to permit bodily movement back and forth relative to said rod. The platen C is preferably formed of tubular metal and the ends of the platen surround the circular flanges 24. The end portions of the platen are longitudinally slotted as at 26 and a clamp 27 surrounds each end portion of the platen and functions to rigidly connect the platen with the heads 22. It will thus be seen that the platen C forms a rigid connection between the lower ends of the side bars 15, 16 of the collating frame, and that the platen is bodily movable with said frame. In order to retain the platen C and the frame G against longitudinal movements along the rod 13, I have mounted two stop collars 28, 28 on the rod 13 beyond the heads 22, the diameters of the collars being greater than the diameters of the openings 25.

Journaled in the rear ends of the end plates 10 and 11 of the carriage is a rock shaft 29 and fixed to said rock shaft adjacent the ends thereof are rock levers 30 and 31 respectively, the lever 30 including an upwardly extending arm 32 and a downwardly extending arm 33, and the lever 31 including an upwardly extending arm 34 and a downwardly extending arm 35. Substantially horizontal links 36 extend rearwardly from the platen C toward the rock shaft 29. These links 36 extend under the rock shaft 29 and have their rear end portions curved upwardly and pivotally connected to the arms 32 and 34 of the levers 30 and 31, as at 37 and 38 respectively. The front ends of these links 36 are pivotally connected as at 38ª, 38ª to depending lugs 39, 39 integral with the lower ends of the side bars 15, 16 of the collating frame. The front ends of the links 36 extend beyond the pivots 38ª and terminate in downwardly extending arms 40, 40 which are pivotally connected at their lower ends as at 41, 41 to the lower ends of the hanger arms 14, 14. Pivotally connected to the upper end of the lever arm 30 by a pivot bolt 42 is the rear end of a link 43, the front end of said link being pivotally connected to the collating frame by a pivot screw 44 which also serves to detachably, although rigidly, connect the upper cross bar 17 with the side bar 15. Pivotally connected to the upper end of the lever arm 31 by a pivot bolt 45 is the rear end of a link 46, the front end of said link being pivotally connected to the collating frame by a pivot screw 47 which also serves to detachably, although rigidly, connect the upper cross bar 17 with the side bar 16.

The collating frame G in its normal position is inclined rearwardly as shown in Figures 3 and 7. In this position of the frame, the platen C is located in its normal or printing position. When, however, the shaft 29 is rocked in a counterclockwise direction, the levers 30 and 31 through the medium of the links 43 and 46 together with the links 36, 36 cause the collating frame G to swing forwardly and the platen C to swing rearwardly to the position shown in Figure 8. Thus the platen C is bodily moved rearwardly from its normal writing position to its abnormal or non-writing position.

The work sheets H are generally arranged in a roll positioned in rear of the machine and the lead-in ends of the work sheets are fed forwardly over a table I, thence over a roller 48 located between the platen C and said table, thence downwardly under a lower guide roller 49 located below the platen C, thence upwardly past the platen and in rear of the main ribbon D, and the end portions are removably clamped to a truck J which is mounted on the collating frame G for upward line spacing movements.

The table I includes a supporting plate 50 of skeleton form as shown particularly in Figure 1. This supporting frame includes side bars 51, 52, front and rear cross bars 53, 54 and an intermediate cross bar 55 which is rigidly connected with the side bars. This intermediate cross bar 55 is provided with elongated slots 56, 56. As shown in Figure 1, the table I is provided with two guides 57, 57 for the work sheets. Each guide includes spaced top and bottom leaves 58 and 59 which are connected along one edge by a wall 60, thereby forming a channel shaped guide which opens inwardly. Rigidly attached to the under face of the bottom leaf 59 is a guide rib 61 which rides in the associated slot 56. A clamping screw 62 is threaded into a correspondingly threaded opening in the guide rib and cooperates with said rib and supporting plate 50 to clamp the guide 57 in any position of lateral adjustment. By means of the guide ribs 61 the guides 57 are capable of being adjusted laterally relative to each other and to maintain their parallel relation during such adjustment. By reason of these guides 57 being laterally adjustable, work sheets H of different widths may be readily employed in this machine.

Disposed along the rear edge of the supporting plate 50 is a roll 63 which is freely journaled in ears carried by the frame 50, the roll functioning to permit the work sheets to easily turn from a vertical plane into the substantially horizontal plane of the table I.

Extending rearwardly from and rigidly attached to the rear wall 7 of the machine frame A is a pair of brackets 64, 64 and rigidly secured to these brackets is a track rail 65. Rigidly connected to the rear end of the supporting frame 50 and depending therefrom are bracket arms 66, 66. A V-shaped supporting arm 67 is pivotally connected at its upper ends as at 68, 68 to the bracket arms 66, 66. A supporting roller 69 is journaled in a bracket 70 fixed to the under face of the apex portion 71 of the V-shaped arm 67 and this roller is engageable with the track rail 65. The upper end portions of the arms 67 extend above the pivot 68 to form short lever arms 72, 72 and these arms are respectively provided with outwardly extending stop pins 73, 73 which project into openings 74, 74 formed in the depending arms 66 to thereby limit the swinging movement of the supporting arm 67. Coil springs 75, 75 are each connected at one end to the upper end of the lever arm 72 and at the other end to the under side of the supporting frame 50 and function to yieldably urge the supporting arm 67 outwardly and thereby maintain the roller 69 in contact with the track rail 65.

The forward end of the supporting plate 50 of the table I is provided with forwardly extending arms 76, 76 and freely journaled in the extreme ends of these arms is the roller 48 over which the work sheets H pass. The arms 76 are each provided with an upwardly opening hook 77. The hooks 77 rest on the tabular stop rod F and engage under screws 78, 78 carried by brackets 79, 79 which are independently adjustable along the tabular stop rod F.

Journaled on the forwardly extending arms 76, 76 and disposed directly in rear of the roll 48 is a rock shaft 80. Fixed to the ends of this rock shaft are rock arms 81, 81 and journaled in these rock arms 81 is a shaft 82 having one or more feed rolls 83 fixed thereon. One end of this shaft extends beyond the right hand rock arm 81 and is provided with a hand wheel 84. The arms 81 are each provided with a laterally extending ear 85 and these ears normally engage the arms 81 to limit the rearward swinging movement of the roll-carrying shaft 82. A coil spring 86 is connected at one end to one of the arms 76 and at its other end to one of the ears 85 and functions to yieldably retain the roll carrying shaft 82 in its abnormal or non-feeding position. When it is desired to move the feed rolls 83 for cooperation with the roll 48 to manually feed the work sheets H either forwardly or backwardly, the operator takes hold of the hand wheel 84 and rocks the arms 81, 81 forwardly against the tension of the spring 86 until the feed rolls 83 are in position to properly cooperate with the feed roll 48 to feed the work sheets, the spring 86 functioning to automatically return the roll carrying shaft 82, and the rolls 83 carried thereby, to its abnormal or inoperative position as soon as the hand wheel 84 is released by the operator.

The lead-in ends of the work sheets H after passing over the guide roll 48 pass forwardly and downwardly under the lower guide roll 49, which is freely journaled in the end plates of the carriage, and thence upwardly past the platen C as previously stated and have their free ends clamped to the vertically movable truck J.

The paper truck J includes a relatively stationary clamping plate $x$ and a relatively movable clamping plate $y$ between which the free ends of the work sheets are adapted to be clamped. The relatively fixed clamping plate $x$ is disposed in front of the movable plate $y$ and is rigidly secured to a cross bar 87 of sheet metal which extends between the two side bars 15 and 16 of the collating frame, and rigidly connected to its ends are forwardly extending brackets 88 and 89. The cross bar 87 is of channel-shaped construction which opens rearwardly and includes a top flange 90. Fixed to the top flange 90 is a pair of brackets 91, 91 and journaled in said brackets is a horizontal shaft 92 having collars 93, 94 fixed thereon beyond the brackets so as to retain said shaft against longitudinal movements. Fixed to the collar 93 and preferably formed integral therewith is a gear 95. Rigidly connected to the other end of the shaft adjacent the collar 94 is a gear 96 and an axially extending handpiece 96ª which is rigidly connected to said gear. Rigidly mounted within the channels of the side bars 15 and 16 of the collating frame are rack bars 97 and 98 respectively which extend longitudinally of said side bars and are provided with rearwardly extending flanges having gear teeth 99 and 100 respectively. The gears 95 and 96 on the shaft 92 respectively mesh with the teeth 100 and 99. Thus upon manipulation of the shaft 92 by the operator's hand through the medium of the handpiece 96ª, the truck J may be raised or lowered and by reason of the gears 95 and 96 being constantly in mesh with the teeth of the rack bars the truck will be maintained in its horizontal position and will be adjusted vertically without any binding action occurring at either end of the truck.

Also fixed to the rigidly extending flange 90 of the cross bar 87 is a pair of S-shaped spring stop fingers 101, 101 which are adapted to engage the platen C whenever the truck is moved to its lowermost position.

Rigidly secured to the cross bar 87 of the truck at the end thereof adjacent the side bar 16 of the collating frame is a rearwardly extending bracket or plate 102. The outer flange 21 of the side bar 16 of said collating frame is provided with a longitudinal series of ratchet teeth 103. A lifting bar 104 is slidably mounted longitudinally on the rack bar 98 through the medium of upper and lower guide pins 105 and 106 fixed to the rack bar 98 and longitudinal slots 107 and 108 formed in the lifting bar 104. This lifting bar 104 is provided with a rearwardly extending flange 109 having a longitudinal series of ratchet teeth 110. A lifting pawl 111 and a holding pawl 112 are fulcrumed on a pin 113 fixed to the bracket plate 102 of the truck, the lifting pawl 111 engaging the teeth 110 of the lift bar 104 and the holding pawl 112 engaging the teeth 103 of the side bar 16 of the collating frame. These pawls are normally held in engagement with said ratchet teeth by means of coil springs 114 and 115. It will thus be seen that when the lifting bar 104 is elevated, the lifting pawl 111 will cause the truck J to be correspondingly elevated and when pressure is released from the lifting bar 104 the holding pawl 112 will retain the truck in its elevated position. The distance between any two adjacent teeth 103 corresponds to the distance of a single line spacing movement. It will therefore be apparent that as the truck J is elevated step-by-step the work sheets H will be correspondingly line spaced.

The relatively movable clamping plate $y$ comprises a body 116 of sheet metal which is bent into U-shaped cross section for receiving a relatively soft insert 117 of rubber or the like. This insert projects beyond the front edge of the holder 116 as shown in Figure 11 and cooperates with the relatively hard stationary plate $x$. The ends of the holder 116 extend beyond the ends of the insert 117 and are slidably supported in guide brackets 118, 118 rigidly secured to the bracket plates 88 and 89 respectively by rivets 119 or the like. Thus the movable clamping plate y is supported on the truck for horizontal sliding movements toward and from the relatively fixed clamping plate x. Pivotally mounted upon horizontal studs 120, 120 fixed to the bracket plates 88 and 89 are finger levers 121, 121. Each lever is formed of sheet metal which is bent into U-shaped construction to include a body 122 and spaced inner and outer flanges or walls 123 and 124 respectively. These flanges or walls 123 and 124 are journaled on the supporting studs 120 and the inner flanges 123 are each formed with an opening 125 for receiving the associated end of the holder 116 of the movable clamping plate. The rear vertical wall 126 of each opening 125 is adapted to engage the rear edges of the holder 116 as shown in Figure 13 so that upon oscillation of the finger levers 121 the movable clamping plate y will be moved forwardly out of operative clamping relation with the stationary clamping plate x. A coil spring 126ª is wound around each pivot stud 120 and one end of this spring bears against the stationary clamping plate x and the other end of said spring bears against the front face of the movable clamping plate y so as to normally urge said clamping plate into yieldable clamping relation with the stationary clamping plate x. An additional coil spring 127 for assisting the spring 126ª is disposed between each stationary clamping plate x and the upper end of each finger lever 121. In order to actuate both finger levers 121 and thereby move the clamping plate y forwardly away from the stationary plate x, I have provided a manually operable cam shaft 128 which is disposed in front of the movable clamping plate y and has its ends journaled in the bracket plates 88 and 89. This cam shaft 128 is recessed as at 129, 129 to form cam surfaces which normally engage the inner faces of the finger levers 121. The cam shaft 128 is provided with a rock arm or lever 130 which terminates in a laterally extending fingerpiece 131. Thus when the rock arm or lever 130 is swung upwardly the rock shaft 128 will be rocked and the cams 129, 129 which engage the finger levers 121 below the pivots 120 thereof will swing the lower ends of said finger levers forwardly against the tensions of the springs 126ª and 127 and thereby slide the movable clamping plate y forwardly along its guides 118, 118. In order to limit the extreme oscillating movements of the rock shaft 128, I have provided the same with upper and lower stop arms 132 and 133, the former cooperating with the upper surface of the movable clamping plate when the operating lever 130 is swung upwardly and the latter cooperating with the under surface of said movable clamping plate when the lever is swung downwardly.

After the truck has been elevated step by step for a distance equal to the length of a form being written, it is desirable to lower the truck so as to have the same engage the next form, and also to permit the written form to be severed. To this end, I have provided a means which is actuated by the lever 130 for automatically disengaging the pawls 111 and 112 whenever said lever 130 is raised for the purpose of opening the truck J. Pivotally mounted as at 134 on the bracket plate 102 of the truck is a pawl release lever 135 having an arm 136 which extends laterally in rear of the upwardly extending tails 137 and 138 of the pawls 111 and 112. This pawl release lever 135 is provided with a rearwardly extending operating arm 139 having a laterally extending ear 140 at the extreme rear end thereof. Fixed to the adjacent end of the cam shaft 128 is a radially extending release finger 141 which is adapted, upon movement of the cam shaft to engage the ear 140 and thereby swing the pawl release lever 135, to effect a disengagement of the pawls 111 and 112 from their respective ratchet teeth 110 and 103. Thus upon upward movement of the operating lever 130 the movable clamping plate y is moved forwardly to release the work sheets and immediately thereafter the pawls 111 and 112 will be disengaged. The truck J is now free of its line spacing mechanism and may be permitted to drop by gravity along the side bars 15 and 16 of the collating frame, the free ends of the work sheets being held by one hand of the operator so as to permit the truck to gravitate relative to said work sheets. The operating lever 130 is then returned to its normal position so as to effect a clamping action on the next succeeding form, and the written form is then severed by the operator tearing the same along the straight-edge formed by the movable clamping plate y, Under some circumstances it may be desirable to release the truck from its escapement mechanism without actuating the movable clamping plate and for this purpose, I have provided the pawl release lever 135 with a rigid fingerpiece 142, and the bracket plate 102 with a corresponding fingerpiece 143. Under these circumstances the operator squeezes the fingerpieces together and the pawl release lever 135 is moved in a direction to release the pawls 111 and 112. As long as the operator maintains the pawls in their released position the truck J is free from its line spacing mechanism and consequently the truck may be moved up or down along the side bars 15 and 16 of the collating frame.

Supported on the cross bar 17 of the collating frame is an end gage 144 for the work sheets which includes a relatively fixed section 145 and a relatively extensible section 146, the former being clamped to the cross bar 17 by a screw 147 and the clamping plate 148. The extensible section 146 is adjustably secured to the relatively fixed section 145 by a clamp 149 and clamping screws 150, and the upper end of the extensible section is provided with a forwardly extending flange 151 forming a gage for the lead-in ends of the work sheets. When the machine is initially loaded the extreme free end of the work sheets are fed upwardly through the truck J and are disposed against the flange 151 of the gage. The extensible section 146 of the gage is vertically adjusted so that the first line of writing on the second form is in its proper printing position, and inasmuch as the forms are of uniform lengths the initial setting of the gage will be sufficient. The truck J is then lowered to its lowermost position and clamped to the form which is now in readiness to be written upon. The initial form is then torn off and the operator proceeds with the writing of the forms in succession.

In the normal or writing position of the collating frame G and platen C, the frame is inclined rearwardly as shown in Figure 3 and the platen is in its forward position as shown in said figure. Thus in the normal positions of these parts the work sheets are caused to be bowed forwardly over and against the platen C between the lower guide roll 49 and the truck J. The work sheets are thereby caused to have a fairly tight contact relation with the platen and thereby effect clear writing on the second sheets which is brought about by interleaved carbon strips K. It is desirable to relieve the tight contact relation between the work sheets and the platen during the line spacing operation of the work sheets so as to avoid said sheets being dragged upwardly against the platen and also to avoid dragging the carbon strips upwardly with said sheets.

I have provided a single manually operable lever 152, which in the present case is the carriage return lever, and have provided connections between this lever and the lever 30 for effecting a forward swinging movement to the collating frame and a simultaneous bodily movement rearwardly to the platen, and connections between said lever 152 and the lift bar 104 for effecting a line spacing movement to the truck J.

The lever 152 is pivoted as at 153 to a supporting bracket 154 which extends laterally from the end plate 10 of the carriage. The inner end of the lever 152 is provided with a cam head 155 having diametrically opposite concentric portions 156 and 157, a recess or cam portion 158 between the portions 156 and 157, a recess 159, and an eccentric portion 160 between the concentric portions 156 and 157 and located opposite the recess or cam portion 158. A lever 161 is fulcrumed at one end to a vertically disposed pivot bolt 162 mounted on the bracket 154 and the free end of the lever 161 is pivotally connected as at 163 to the front end of a line 164 which is pivotally connected at its rear end as at 165 to the depending arm 33 of the lever 30. A roller 166 is journaled on a vertical pin 167 on the lever 161, and this roller is normally seated in the recess or cam portion 158 of the operating lever 152. Thus when the lever 152 is moved to the right the roller 166 will ride along the surface of the recess 158 until it is positioned on the concentric portion 157. During this movement of the lever 152, the lever 161 will be swung rearwardly and consequently the link 164 will be also swung rearwardly. This rearward movement of the link 164 will oscillate the lever 30 and the rock shaft 29, and the lever 30 together with the lever 31 will swing the collating frame G forwardly to an upright position from the position shown in Figure 7 to the position shown in Figure 8, and simultaneously cause the platen C to be moved rearwardly a distance sufficient to relieve the normal tight contact relation between the work sheets and the platen.

In order to effect line spacing movements to the truck J by the hand lever 152 subsequent to the platen C being moved to its rearmost position, I have provided a lever 168 which is pivoted on the pivot bolt 162, and pivotally connected to the free end of this lever as at 169 is the front end of a link 170, the rear end of said link being pivotally connected as at 171 to the upper end of a vertical arm 172 of a bell crank lever 173 which is pivoted at its angle as at 174 to the end plate 10 of the carriage. The horizontal arm 175 of the bell crank lever extends forwardly and is pivotally connected as at 176 to the lower end of a vertically extending link 177 which is freely pivoted at its upper end as at 178 to the lift bar 104. The lever 168 is provided with a forwardly extending arm 179 which terminates in an upturned end or toe 180. Journaled on the head 156 of the operating lever 152 is a roller 181 which is located on the lever in such a position that when said lever is in its normal position the roller 181 is spaced a considerable distance from the toe 180 of the lever 168 and will not contact with said toe until the operating lever 152 has been swung to the right a distance sufficient to completely move the platen C rearwardly and swing the collating frame G forwardly. Consequently upon continued movement of the operating lever 152, the roller 181 will engage the toe 180 of the lever 168 and thereby swing the latter rearwardly which through the medium of the link 170, bell crank lever 173 and vertical link 177, will elevate the lift bar 104 and thereby effect a line spacing movement to the truck J.

In some conditions of work it may be desirable to effect a single line space movement to the work sheets whereas with other work, it may be desirable to impart a double line space movement to said work sheets. I have, therefore, provided a means which may be adjusted to limit the line spacing movement of the truck to a single movement or which may be adjusted to permit a double line space movement to be imparted to the truck. To this end, there is mounted upon the bracket 154 a cover plate 182 having a depending rear flange 183 provided with an elongated opening or slot 184. Journaled in the bracket 154 and in the cover plate 182 is a vertically disposed oscillatory post 185 having an operating handle or fingerpiece 186 disposed above the cover plate 182. This post 185 is provided with a laterally extending stop pin 187 which projects outwardly through the slot or opening 184. A collar 188 is loosely mounted on the pin 187 between the flange 183 of the cover plate and the post 185, and a coil spring 189 is disposed around the pin 187 between the collar 188 and the post 185. The post 185 may be oscillated to either of its extreme positions by the handpiece 186, and the spring 189 and the collar 188 will function to retain the post in either of its extreme positions, said extreme positions being determined by the length of the slot or opening 184. When the stop pin 187 is in the position shown in Figures 24 and 26, a double space movement may be imparted to the truck J, and when the pin is oscillated to the right as shown in Figure 25, a single space movement only can be imparted to the truck J. The post 185 is provided with a recess 190, and a limiting plate 191 is pivotally connected to the carriage return lever 152 by a pin 192. This plate 191 extends rearwardly from the pin 192 toward the post 185 and overlies the levers 161 and 168. The pin 167 on which the collar 166 is journaled projects upwardly into an angular slot 193 formed in the limiting plate 191. When the post 185 is in the position shown in Figures 24 and 26, the limiting plate 191 will be moved rearwardly into the recess 190 of said post during movement of the carriage return lever and thereby permit a double line spacing movement to be imparted to the truck J. When it is desired to limit the feeding movement of the truck J to a single line space, the post 185 is turned to the other extreme position as shown in Figure 25, thus turning the recess 190 of said post out of the path of movement of the limiting plate 191. Consequently when the carriage return lever 152 is swung to the right, a single line space movement only will be imparted to the truck J, because further movement of the carriage return lever in the same direction will be prevented by reason of the limiting plate 191 engaging the post 185 and thereby stopping further swinging movement of said lever.

Thus during the first part of the swinging movement of the carriage return lever 152, that is, from the point $a$ to the point $b$, in Figure 27, the rearward movement of the platen C and the forward swinging movement of the collating frame G will be effected, and during further swinging movement of the carriage return lever in the same direction, that is, between the points $c$ and $e$, the line spacing movement to the truck J will be effected. It will, therefore, be apparent that the platen C remains in its extreme backward position during the time the carriage return lever 152 is being moved to the right from the point $b$ to either of the points $d$ or $e$ which indicate the single and double line space positions respectively of the operating lever, and that the line spacing movement to the truck J begins after the platen has reached its extreme backward movement and occurs between the points $c$ and $d$ or between the points $c$ and $e$ depending upon whether a single line space movement or a double line space movement is being effected.

The carriage return lever 152 is provided with a pair of fixed stops 194, 195 which cooperate with the bracket 154 to limit the extreme swinging movements of said lever.

As shown particularly in Figures 7 and 8, the position of the lower guide roll 49 is such that the work sheets will remain in contact with the platen C even when the platen is moved rearwardly, but the rearward movement of the platen is sufficient to relieve the normal tight contact relation between the work sheets and the platen.

In Figures 17 and 18, I have shown a slightly modified form in which the lower guide roll 49 is located in a position slightly in advance of the position occupied by the roll in Figures 7 and 8, whereby the platen C when moved to its rearmost position and the collating frame swung forwardly to its vertical position, a complete separation between the work sheets and the platen will be effected.

I have also disclosed means for supporting and feeding a plurality of auxiliary ribbons K, which are preferably in the form of narrow carbon strips, across the front of the platen in a direction transverse to the travel of the work sheets H and interleaved therewith. These carbon strips are fed from the rear of the machine from a supply which is supported directly on the main frame of the machine, thence forwardly along the left side of the carriage, thence across the front of the machine where they are interleaved with the work sheets and thence rearwardly along the right hand side of the carriage to a carbon strip feeding mechanism 217. Tensioning means 218 is mounted on the left hand side of the carriage for gradually applying a tension to the carbon strips during feeding movement thereof and prior to the line spacing movement of the truck J, the maximum tension remaining constant during said line spacing movement.

In some classes of work it is desirable to employ forms of different widths, or to employ two sets of forms of equal width. I have, therefore, shown in Figures 28 and 29 a modified construction of the paper table, wherein I have provided a pair of upper paper guides 256 arranged above the lower guides 57. Only one of these paper guides 256 is illustrated in the drawings but it will be understood that the second guide is a duplication thereof. These guides 256 are each identical with the guides 57 except that they extend downwardly as shown in Figure 29 and are supported on a cross plate 257 for adjustment transverse of the machine similar to the lower guides 57. Each of the upper guides 256 is provided with a clamping screw 258 similar to the clamping screw 62 of the lower guide 57 but this clamping screw 258 extends upwardly above the supporting plate 257 and consequently both the lower and upper guides are accessible for transverse adjustments. In Figure 28, I have illustrated an additional set of work sheets H' which extend over a roller 259 which is disposed in front of the roller 63 and is supported on the paper table I in the same manner. These additional work sheets H' thence extend forwardly through the upper paper guides 256, thence over the roller 48, thence downwardly under the lower guide roller 49 and thence upwardly past the platen to the truck J, the secondary work sheets H' being disposed in rear of the work sheets H where they pass the platen. It will thus be seen that when two sets of forms of different widths are employed, the narrow set may be readily centered on the carriage or it may be positioned either on the left or right hand end of the carriage, the position of the narrow set being determined by the location of the adjustable paper guides.

In operation the lead-in ends of the work sheets H are drawn over the roller 63, thence along the edge guides 57 and 58 of the paper table I, thence under the rollers 83 and above the roller 48, thence downwardly under the lower guide roll 49, and thence upwardly past the platen C. The lead-in ends of the work sheets are not at this time clamped to the truck J. The carbon strips K are then interleaved with the work sheets. The operating handle 131 of the truck J is then actuated so as to move the front or movable clamping plate y forwardly and the lead-in ends are then inserted in said truck. It will be observed that the clamp is now open and consequently the work sheets may be drawn upwardly through the truck, and while the work sheets are thus held against downward movement by one hand of the operator, the other hand of the operator may engage the finger pieces 142, 143 and release the truck from the line spacing means thereby permitting the truck to gravitate onto the platen C. The work sheets as previously stated are usually made up of connected forms and the upper edge of the lead-in form is then positioned against the forwardly extending flange 151 of the end gage 144 which is mounted at the top of the collating frame. This gage determines the proper writing position for the next form. The first form is then torn off, and the work sheets are clamped to the truck J by the operator engaging the hand lever 130 and thereby returning the movable clamping plate y to its normal or clamping position. The operator then proceeds to write the first line on the form. The operator then swings the carriage return lever 152 to the right which swings the collating frame forwardly and the platen rearwardly thereby relieving the tight contact relation which previously existed between the work sheets, carbon strips and the platen. Simultaneously with the rearward movement of the platen, the carbon strip tensioning device 218 is actuated to apply a gradually increased tension to said strips, and simultaneously with the application of this tension the carbon strip feeding means 217 is actuated whereby the strips are fed through the tensioning device while a gradually increased tension is being applied to said strips. After these operations have been performed, the operator continues to swing the carriage return lever 152 in the same direction and consequently a line spacing movement is imparted to the truck J and thus to the work sheets H. The operator upon continued pressure on the carriage return lever 152 causes the carriage to be returned to its original writing position, and upon release of said lever, the same will return to its initial position, and the collating frame will return to its original rearwardly inclined position.

The above writing and line spacing operations are repeated as often as desired and when a given form has been completed, the clamp of the work truck is opened and permitted to gravitate onto the platen C, the operator holding the written form with her hand against dropping with the truck. The clamp of the truck is then closed so as to clamp the next form to the truck, and the previously printed form is then torn off.

I claim:—

1. In a manifolding device, the combination of a collating frame including spaced side bars having inwardly extending circular flanges and a tubular platen rigidly connected at its ends to said circular flanges.

2. In a manifolding device, the combination of a collating frame including spaced side bars having inwardly extending circular flanges, a tubular platen having longitudinally split ends respectively surrounding the circular flanges, and clamps respectively surrounding the split ends of the platen.

3. In a manifolding device, the combination with a horizontal supporting rod, of a collating frame pivotally supported on said rod and including spaced side bars having openings through which the rod extends, and a tubular platen surrounding the rod and having its ends rigidly connected to the side bars.

4. In a manifolding device, the combination with a horizontal supporting rod, of a collating frame pivotally supported on said rod and including spaced side bars having openings through which the rod extends, circular flanges extending inwardly from the side bars and surrounding the openings therein and the supporting rod, and a tubular platen surrounding the rod and having its ends rigidly connected to the flanges of the side bars.

5. In a manifolding device, the combination with a horizontal supporting rod, of a collating frame pivotally supported on said rod and including spaced side bars having openings through which the rod extends, circular flanges extending inwardly from the side bars and surrounding the openings therein and the supporting rod, a tubular platen having longitudinally split ends respectively surrounding the circular flanges, and clamps respectively surrounding the split ends of the platen.

6. In a manifolding device, the combination of a collating frame including spaced side bars, a tubular platen rigidly connected at its ends to said side bars, means for pivotally supporting the collating frame whereby the platen will be bodily moved rearwardly when the frame is swung forwardly, and means for swinging said frame.

7. In a manifolding device, the combination of a collating frame including spaced side bars, a tubular platen rigidly connected at its ends to said side bars, a horizontal supporting rod, means for pivotally supporting the collating frame on said rod whereby the platen will be bodily moved rearwardly when the frame is swung forwardly, and means for swinging said frame.

8. In a manifolding device, the combination with a carriage having end plates; of a horizontal rod supported on said end plates; a normally rearwardly inclined collating frame disposed between said end plates and including spaced side arms; a platen rigidly connected at its ends to the lower ends of said side arms; hangers pivotally mounted on said rod; a horizontal rock shaft journaled on the carriage in rear of the collating frame; spaced levers fixed to said rock shaft; thrust links pivotally connected at their rear ends to said levers, and having their forward ends extending over said rod and pivotally connected to the lower ends of said side bars, said links thence extending downwardly in front of said rod and having their ends pivotally connected to said hangers; and means for actuating the rock shaft to effect a forward swinging movement to the collating frame and a bodily movement rearwardly to the platen.

9. In a manifolding device, the combination with a carriage having end plates; of a horizontal rod supported on said end plates; a normally rearwardly inclined collating frame disposed between said end plates and including spaced side arms; a platen rigidly connected at its ends to the lower ends of said side arms; hangers pivotally mounted on said rod; a horizontal rock shaft journaled on the carriage in rear of the collating frame; spaced levers fixed to said rock shaft and including upper and lower arms; lower thrust links pivotally connected at their rear ends to the lower arms of said levers, and having their forward ends extending over said rod and pivotally connected to the lower ends of said side bars, said links thence extending downwardly in front of said rod and having their ends pivotally connected to said hangers; upper thrust links pivotally connected at their rear ends to the upper arms of the levers and their front ends pivotally connected to the upper ends of the side bars of the collating frame; and means for actuating the rock shaft to effect a forward swinging movement to the collating frame and a bodily movement rearwardly to the platen.

10. In a manifolding device, the combination with a carriage having end plates; a platen disposed between said end plates; hangers pivotally mounted on said end plates; a horizontal rock shaft journaled on the carriage in rear of the platen; spaced levers fixed to said rock shaft; thrust links pivotally connected at their rear ends to said levers, and having their forward ends pivotally connected to the platen, said links thence extending downwardly and having their ends pivotally connected to said hangers; and means for actuating the rock shaft to effect backward and forward bodily movements to the platen.

11. In a manifolding device, the combination with a carriage having end plates; of a horizontal rod supported on said end plates; a platen disposed between said end plates; hangers pivotally mounted on said rods; a horizontal rock shaft journaled on the carriage in rear of the platen; spaced levers fixed to said rock shaft; thrust links pivotally connected at their rear ends to said levers, and having their forward ends extending over said rod and pivotally connected to the platen, said links thence extending downwardly in front of said rod and having their ends pivotally connected to said hangers; and means for actuating the rock shaft to effect backward and forward bodily movements to the platen.

12. In a manifolding device, the combination with a carriage having end plates; of a collating frame disposed between said end plates; hangers pivotally mounted on said end plates; a horizontal rock shaft journaled on the carriage in rear of the collating frame; spaced levers fixed to said rock shaft; thrust links pivotally connected at their rear ends to said levers, and having their forward ends pivotally connected to the collating frame, said links thence extending downwardly and having their ends pivotally connected to said hangers; and means for actuating the rock shaft to effect backward and forward swinging movements to the collating frame.

13. In a manifolding device, the combination with a carriage having end plates; of a horizontal rod supported on said end plates; a collating frame disposed between said end plates; hangers pivotally mounted on said rod; a horizontal rock shaft journaled on the carriage in rear of the collating frame; spaced levers fixed to said rock shaft; thrust links pivotally connected at their rear ends to said levers, and having their forward ends extending over said rod and pivotally connected to the collating frame, said links thence extending downwardly in front of said rod and having their ends pivotally connected to said hangers; and means for actuating the rock shaft to effect swinging movements to the collating frame.

14. In a manifolding device, the combination with a carriage having end plates; of a collating frame disposed between said end plates; hangers pivotally mounted on said end plates; a horizontal rock shaft journaled on the carriage in rear of the collating frame; spaced levers fixed to said rock shaft and including upper and lower arms; lower thrust links pivotally connected at their rear ends to the lower arms of said levers, and having their forward ends pivotally connected to the lower portion of said collating frame, said links thence extending downwardly and having their ends pivotally connected to said hangers; upper thrust links pivotally connected at their rear ends to the upper arms of the levers and their front ends pivotally connected to the upper portion of the collating frame; and means for actuating the rock shaft to effect backward and forward swinging movements to the collating frame.

15. In a manifolding device, the combination with a carriage including a platen past which work sheets are fed; of a collating frame mounted on the carriage and extending upwardly above the platen; a pair of vertically disposed rack bars fixed to the collating frame; a truck mounted on the frame for vertical movements and including means for clamping the lead-in ends of work sheets thereto; a horizontal shaft journaled on the truck and having gear connections with said rack bars; and a handpiece fixed to one end of the shaft for manually rotating the same to move the truck vertically along the collating frame.

16. In a manifolding device, the combination with a carriage including a platen past which work sheets are fed; of a collating frame mounted on the carriage and extending upwardly above the platen; a truck mounted on the frame for vertical movements and including means for clamping the lead-in ends of work sheets thereto; manually operable means for effecting line spacing movements to the truck along the collating frame; means for disconnecting the truck from said manually operable line spacing means; and manual means for moving the truck along the collating frame when the truck is disconnected from the line spacing means.

17. In a manifolding device, the combination with a carriage including a platen past which work sheets are fed; of a collating frame mounted on the carriage and extending upwardly above the platen; a truck mounted on the frame for vertical movements and including means for clamping the lead-in ends of work sheets thereto; manually operable means for effecting line spacing movements to the truck along the collating frame; means for disconnecting the truck from said manually operable line spacing means, and manual means for moving the truck along the collating frame when the truck is disconnected from the line spacing means, said manual means comprising a pair of vertically disposed rack bars fixed to the collating frame, a horizontal shaft journaled on the truck and having gear connections with said rack bars, and a handpiece fixed to one end of the shaft for manually rotating the same to move the truck vertically along the collating frame.

18. In a manifolding device, the combination with a platen past which work sheets are fed; of a collating frame over which the work sheets pass after leaving the platen and including spaced side bars, a truck mounted for vertical movements along the side bars of said frame and including means for clamping the lead-in ends of the work sheets to the truck, said clamping means comprising relatively stationary and movable clamping plates extending substantially for the full distance between the side bars of the collating frame, the latter being movable in a straight line towards and from the former; and means for effecting line spacing movements to said truck.

19. In a manifolding device, the combination with a platen past which work sheets are fed; of a collating frame over which the work sheets pass after leaving the platen, a truck mounted for vertical movements along said frame and including means for clamping the lead-in ends of the work sheets to the truck, said clamping means comprising horizontal guides on the fixed plate for slidably receiving the ends of the movable plate, means for yieldably retaining the movable plate in clamping engagement with the fixed plate, and manually operable means for moving the movable plate along the guides out of clamping engagement with the fixed plate; and means for effecting line spacing movements to said truck.

20. In a manifolding device, the combination with a platen past which work sheets are fed; of a collating frame over which the work sheets pass after leaving the platen, a truck mounted for vertical movements along said frame and including means for clamping the lead-in ends of the work sheets to the truck, said clamping means comprising horizontal guides on the fixed plate for slidably receiving the ends of the movable plate, means for yieldably retaining the movable plate in clamping engagement with the fixed plate, and manually operable means including a cam shaft journaled on the fixed plate for moving the movable plate along the guides out of clamping engagement with the fixed plate; and means for effecting line spacing movements to said truck.

21. In a manifolding device, the combination with a platen past which work sheets are fed; of a collating frame over which the work sheets pass after leaving the platen, a truck mounted for vertical movements along said frame and including means for clamping the lead-in ends of the work sheets to the truck, means for effecting line spacing movements to the truck, manually operable means for opening the clamping means and for disconnecting the truck from the line spacing means to permit the truck to gravitate to the platen; and spring buffers carried by the truck for engaging the platen.

In testimony whereof, I have hereunto subscribed my name.

GUSTAVE O. DEGENER.